United States Patent
Chen et al.

(10) Patent No.: US 7,715,421 B2
(45) Date of Patent: May 11, 2010

(54) THIRD PARTY CALL CONTROL OF ALL PHONES

(75) Inventors: Yihsiu Chen, Middletown, NJ (US);
Steve Fisher, Morristown, NJ (US);
Mark J. Foladare, East Brunswick, NJ (US); Samuel Glazer, New York, NY (US); Shelley B. Goldman, East Brunswick, NJ (US); Thaddeus Kowalski, Summit, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 930 days.

(21) Appl. No.: 10/773,640

(22) Filed: Feb. 5, 2004

(65) Prior Publication Data
US 2005/0180457 A1    Aug. 18, 2005

(51) Int. Cl.
*H04J 3/26* (2006.01)
(52) U.S. Cl. ...................................... 370/432; 370/466
(58) Field of Classification Search ................. 370/446, 370/465, 464, 280, 281, 298, 310, 466
See application file for complete search history.

(56) References Cited

U.S. PATENT DOCUMENTS 6,324,265 B1    11/2001  Christie, IV
6,934,279 B1 *  8/2005   Sollee et al. ................. 370/352
7,006,436 B1 *  2/2006   Chu et al. .................... 370/230
7,042,871 B2 *  5/2006   Gallant et al. ................ 370/352
7,145,900 B2 * 12/2006   Nix et al. .................... 370/352
2002/0126701 A1 * 9/2002 Requena ...................... 370/469
2002/0141386 A1 * 10/2002 Minert et al. ................ 370/352
2003/0058844 A1 *  3/2003 Sojka et al. .................. 370/352
2003/0072300 A1    4/2003 Kwon
2003/0110292 A1 *  6/2003 Takeda et al. ................ 709/245
2003/0185232 A1 * 10/2003 Moore et al. ................. 370/465
2003/0210678 A1   11/2003 Haukka
2004/0170268 A1 *  9/2004 Hakusui ................... 379/211.02

FOREIGN PATENT DOCUMENTS

| EP | 1071246      | 1/2001 |
| EP | 1111875      | 6/2001 |
| EP | 1313288      | 5/2003 |
| WO | WO 01/63945  | 8/2001 |

OTHER PUBLICATIONS

Siemens Information and Communication Networks Inc., "OpenScape V1.0 New Intelligence in Communications", Apr. 1, 2003, 6 page(s), Germany.

* cited by examiner

*Primary Examiner*—Phuc Tran
(74) *Attorney, Agent, or Firm*—Michael K. Dixon; Akerman Senterfitt

(57) ABSTRACT

A system and method for call control wherein a call received at a communication device may be controlled through an IP device connected to an IP network over which at least a portion of the call was routed. The IP device is connected to the IP network via a control gateway.

8 Claims, 6 Drawing Sheets

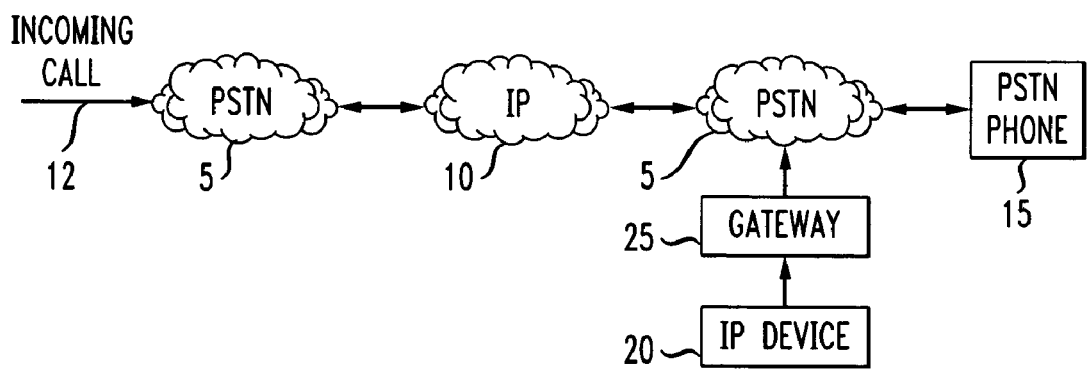
FIG. 1
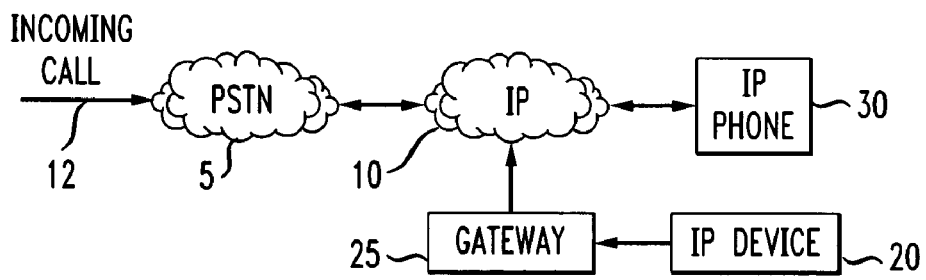
FIG. 2
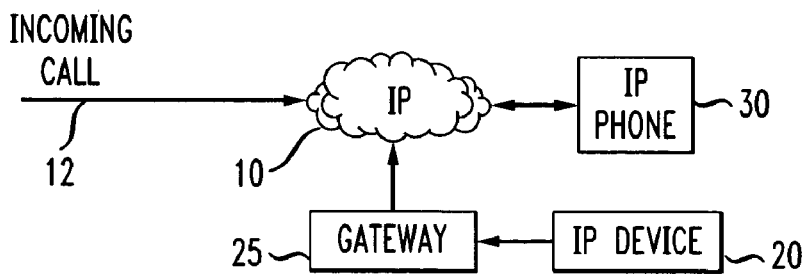
FIG. 3
FIG. 4
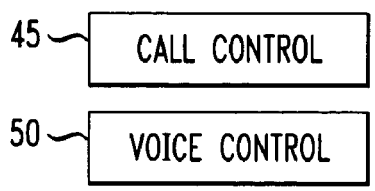

THIRD PARTY CALL CONTROL OF ALL PHONES

BACKGROUND OF THE INVENTION

The present invention relates to the control of calls to communication devices, and more particularly, to the control of calls over IP networks using the SIP protocol. Within a network architecture, a company may want to provide a network application to customers who have legacy systems that are incapable of providing the desired network application. In these cases the user would be required to install proprietary equipment and/or software enabling them to implement the desired application. This, of course, can be unacceptable to many smaller customers who do not have the resources to upgrade their existing network architecture. Thus, there has arisen a need for the ability to provide particular applications to a customer without requiring the upgrading or altering or their existing legacy system.

BRIEF SUMMARY OF THE INVENTION

The present invention overcomes the foregoing and other problems with a system and method for call control wherein a call received at a communication device that has been routed over at least one IP network can be controlled via an IP device that is connected to the IP network by a control gateway.

A more complete appreciation of the present invention and the scope thereof can be obtained from the accompanying drawings which are briefly summarized below, the following detailed description of the presently-preferred embodiments of the invention, and the appended claims.

BRIEF DESCRIPTION OF THE DRAWINGS

A more complete understanding of the method and apparatus of the present invention may be obtained by reference to the following Detailed Description when taken in conjunction with the accompanying Drawings wherein:

FIG. 1 is a first embodiment of a system providing third party call control according to the present invention;

FIG. 2 illustrates a second embodiment of a system for providing third party call control;

FIG. 3 illustrates a third embodiment of a system for providing a third part call control; and FIG. 4 illustrates the functional structure of the SIP protocol or similar protocol for use with the present invention.

DETAILED DESCRIPTION OF THE INVENTION

Figure 5:
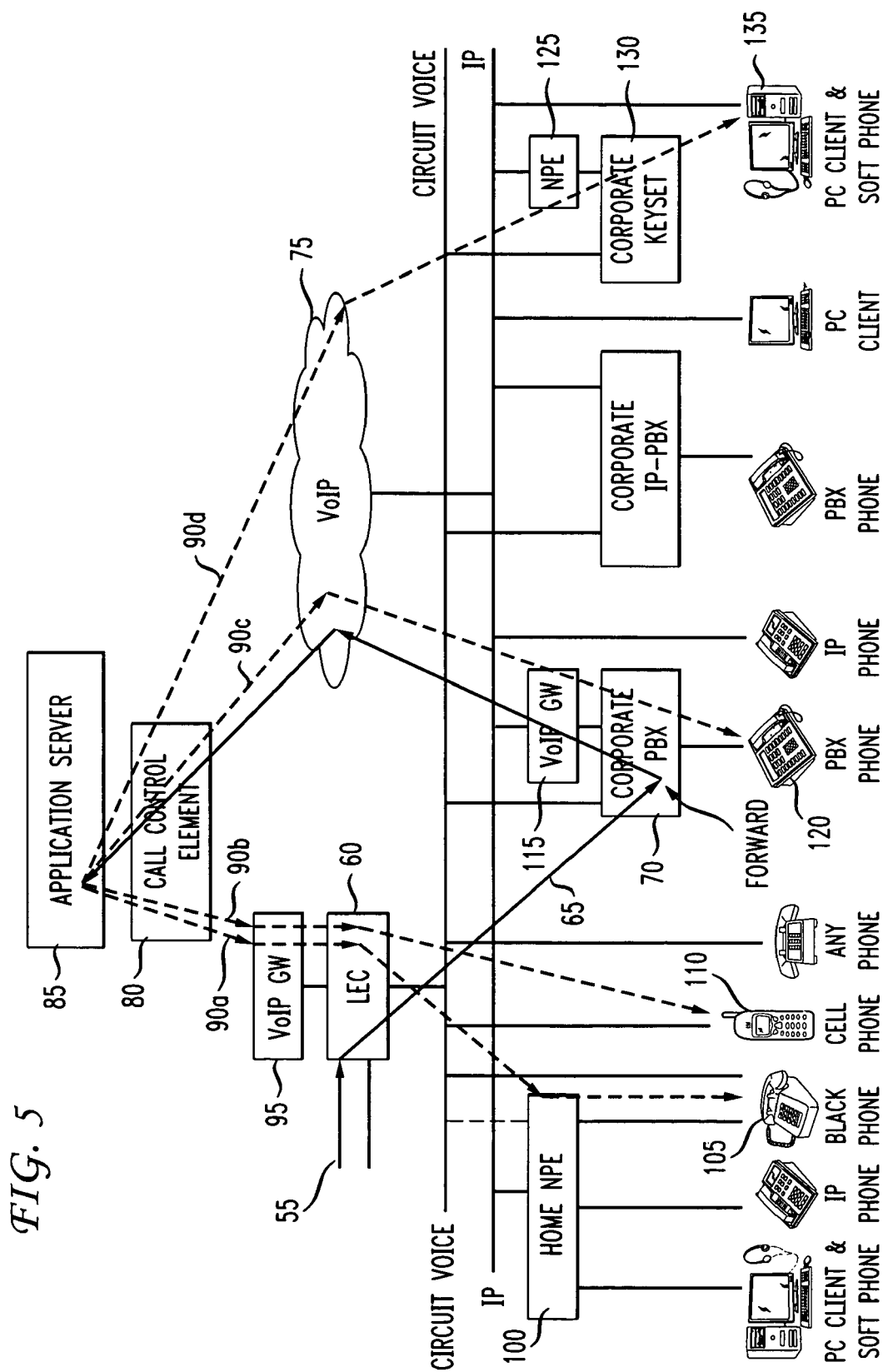
FIG. 5 illustrates the manner in which a third party may manage multiple devices and telephone numbers.

The present invention will now be described more fully hereinafter with reference to the accompanying drawings, in which preferred embodiments of the invention are shown. This invention may, however, be embodied in many different forms and should not be constructed as limited to the embodiments set forth herein; rather, these embodiments are provided so that this disclosure will be thorough and complete, and will fully convey the scope of the invention to those skilled in the art.

Referring now to the drawings, and more particularly to FIG. 1, where there is illustrated a call interconnection utilizing a PSTN network 5, and an IP network 10. An incoming call 12 is directed to a PSTN telephone 15 by being routed through the PSTN network 5, through the IP network 10 and then through PSTN network 5 to the PSTN phone 15. In this case, the PSTN phone 15 has no ability to provided any call control functionality for the incoming call 12. However, since a portion of the call routing is directed through the IP network 10, this provides for the ability of the third party being called on the PSTN phone 15 to utilize various call control applications using an IP device 20. The IP device 20 is interconnected to the IP network 10 through a control gateway 25. The IP device 20 utilizes the SIP protocol within the IP network 10 to control the manner in which the call is routed and controlled. Using the SIP protocol, applications such as remote voice mail screening, call transfer to another phone prior to picking up the destination phone, midcall transfer to another phone, call logging, adding the call to an audio conference, putting the caller on hold, remote call hangup, ringing multiple phones on the incoming call, a screen popup on a PC that tells who is calling, providing information about the caller (address, phone number, picture, etc.), managing multiple devices and telephone numbers, controlling one button dialing from a nearby phone, voice dialing control, and midcall transfers.

Referring now to FIGS. 2 and 3, there are illustrated alternative embodiments of the way in which a call may be routed and controlled by a third party according to the system of the present invention. In FIG. 2, the incoming call is routed through the PSTN network 5 and an IP network 10 to an IP phone 30. The IP device 20 is interconnected to the IP network 10 via the control gateway 25. As is the case in FIG. 1, various applications can be provided for the calls being received by the IP phone 30 through the IP device 20 attached to the control gateway 25. Additionally, it should be noted that rather than the separate IP device 20, the IP phone 30 could provide a control mechanism for the incoming call 12 over the IP network 10.

Referring now to FIG. 3, there is illustrated yet a third embodiment of the operation of the present invention wherein an incoming call is routed only through an IP network 10 to an IP phone 30. As before, control applications are provided for the incoming call 12 using an IP device 20 interconnected to the IP network through a control gateway 25 or control could be provided by the IP phone 30.

While the present invention envisions use of the SEP protocol for providing third party call control using an IP device 20 at a control gateway 25, any similarly operating IP protocol can implement the system and method of the prevent invention. The functional structure of the SIP protocol, as illustrated in FIG. 4, provides two levels of control, the call control functions 45 and the voice control functions 50. The call control functions 45 provide for control of the call being transferred over an IP network. The voice control functionalities 50 provide for control of the voice packets being transmitted over the IP network. Any IP protocol providing the separate call control and voice control functionalities would also be usable in implementing this system and method of the present invention.

Referring now to FIGS. 5-9, there are more particularly illustrated various manners in which third party call control may be provided using the SIP or similar type protocol for a call link including routing through an IP network. Referring now to FIG. 5, there is illustrated the receipt of an incoming call 55 at the local exchange carrier (LEC 60). The LEC 60 forwards at 65 the call to a corporate PBX 70 associated with a called number. Using an IP device, the call is forwarded from the corporate PBX 70 over an IP network 75 to a call control element 80 and application server 85. The application server 85 implements call redirection features to enable the ringing at multiple telephones. The call control element 80 is a call routing engine which translates the logical addresses used by the application server 85 (such as a phone number, an SIP address, etc.) into a physical address on the IP network 75. The application server 85 routes the call over multiple call links 90 to various destinations which may then ring an associated phone. Link 90a is routed from the application server 85 to the call control element 80 to a voice over IP gateway 95 back through the local exchange carrier 60 to a home NPE 100 and associated black phone 105. Link 90b is routed through the call control element 80 voice over IP gateway 95 and LEC 60 to a wireless cell phone 110. Link 90c is routed to the call control element 80 over the voice over IP network 75 to a voice over IP gateway 115 back to the corporate PBX 70 to a PBX phone 120. Link 90d is routed through the call control element 80 and voice over IP network 75 to the NPE 125 and corporate keyset 130 attached to a soft phone 135. In this way, a single call may be rung at multiple destination phones.

Figure 6:
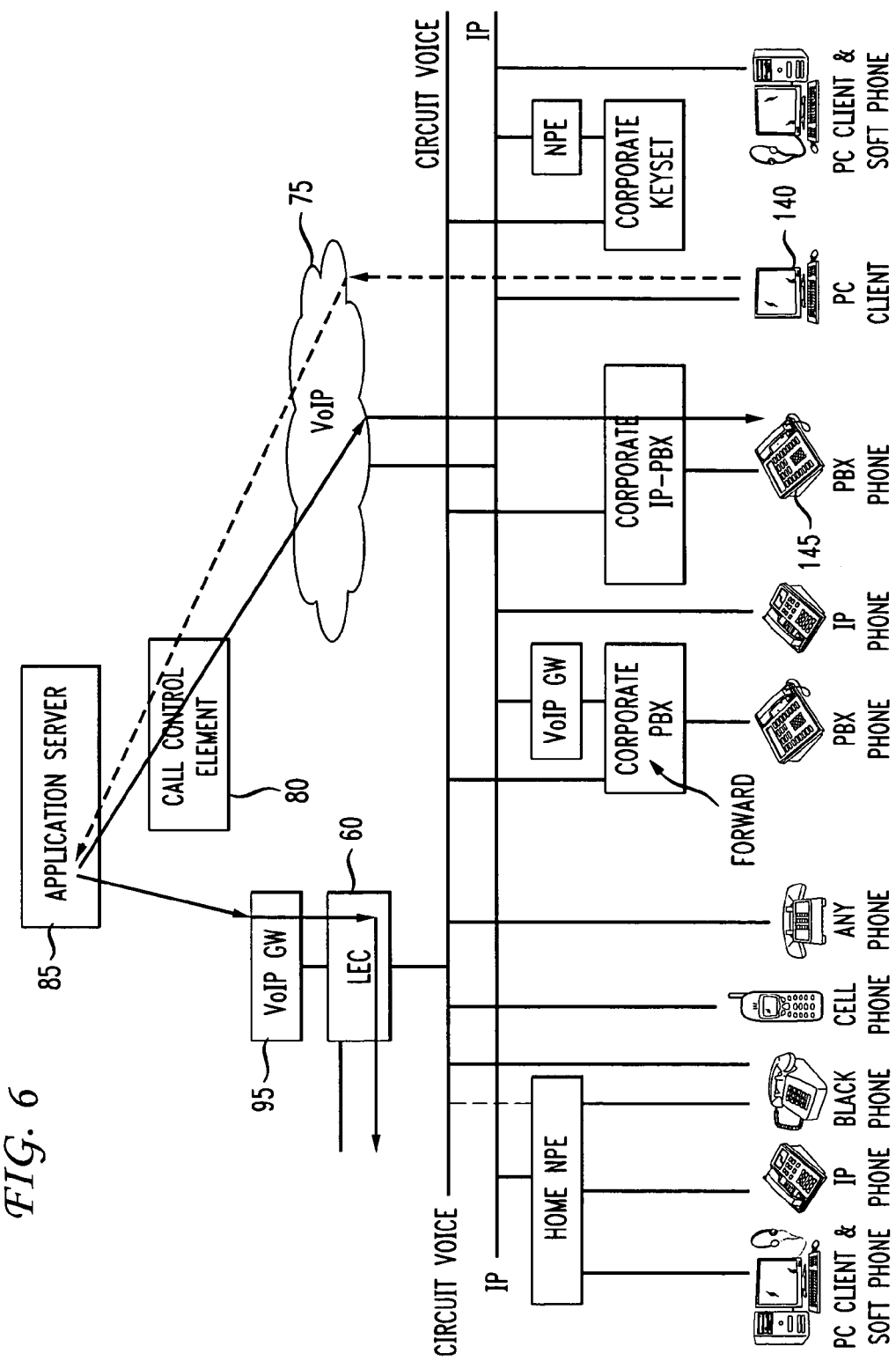
FIG. 6 illustrates the manner in which a third party may control one button dialing from a nearby phone.

FIG. 6 illustrates the use of a directory and a click to dial scheme. A PC client 140 connected to IP network 75 is used to click on a particular number which is to be dialed. This information is routed over the IP network 75 to the call control element 80 and application server 85. The application server 85 and call control element 80 then enable a connection to a PBX phone 145 over a link 150 through the IP network 75. Alternatively, rather than calling a PBX phone 145 locally connected to the PC client 140, a call may be sent out over the local exchange carrier 60 via the voice over IP gateway 95.

Figure 7:
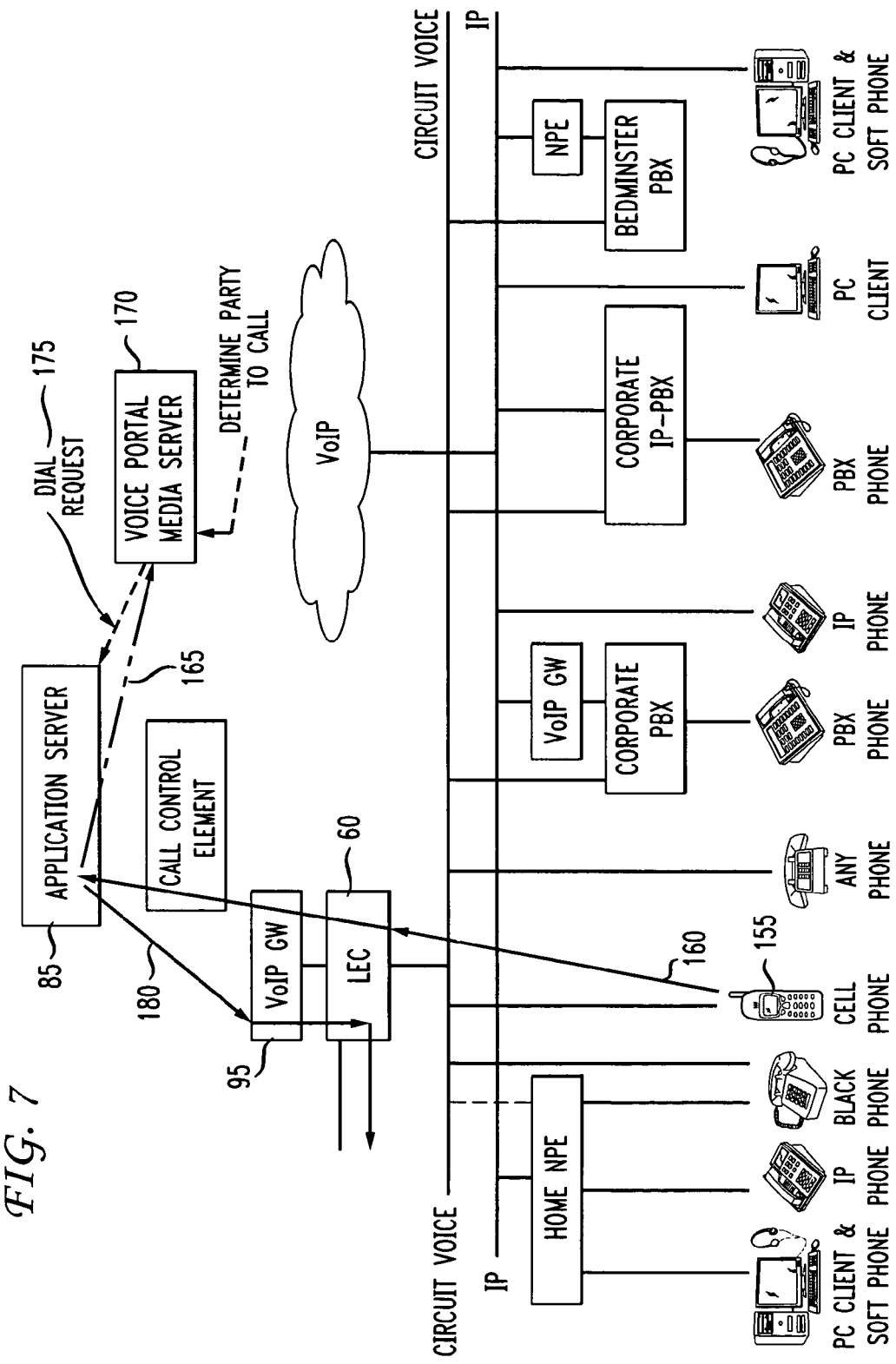
FIG. 7 illustrates the manner in which a third party may control voice dialing.

Referring now to FIG. 7, there is illustrated the manner of using voice control as a manner of third party control. In this case, the cell phone 155 provides a particular voice command which is forwarded at 160 over the LEC 60 and voice over IP gateway 95 to the application server 85. The application server 85 requests at 165 for the voice portal media server 170 to determine the party to call from the voice request 160. When the party to call is determined, a dial request 175 is transmitted back to the application server 85. The dial request 85 is used to establish a connection to the called party at 180 through the voice over IP gateway 95 and LEC 60. It should be noted that any type of call control can originate from the application server 85 in response to a voice input from a third party.

Figure 8:
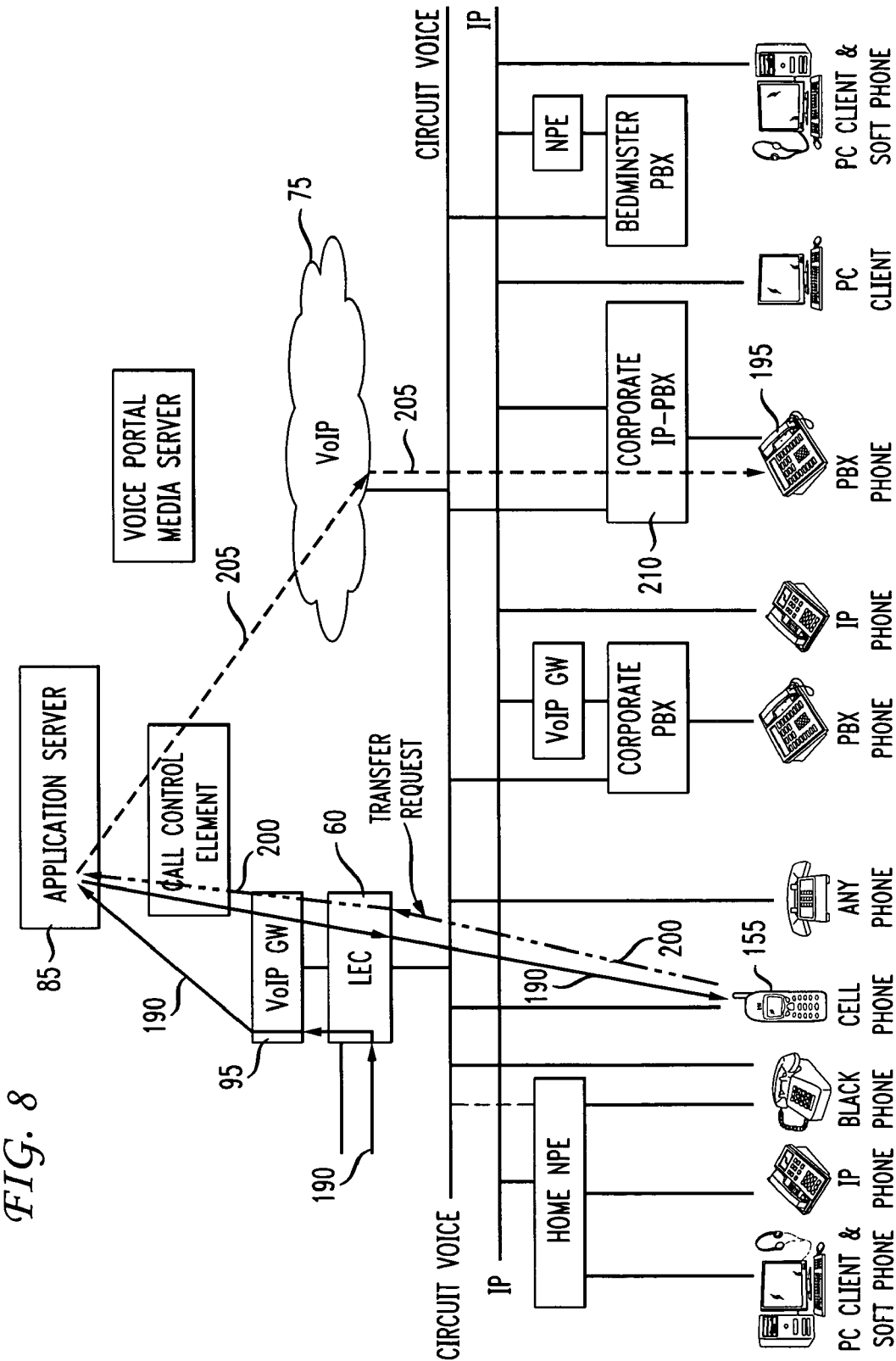
FIG. 8 illustrates the manner in which a third party may provide a mid-call transfer.

Referring now to FIG. 8, there is illustrated the manner in which third party call control may be used to transfer a call in the middle of the call. An original incoming call is provided to cell phone 155 over a call link 190 through the LEC 60, the voice over IP gateway 95 and the application server 85. If during the call, the user of the cell phone 155 desires to transfer the call to, for example, a PBX phone 195, the transfer request 200 is sent through the LEC 60 back to the application server 85. The application server 85 routes the call through a new call connection link 205 to the IP network 75 and the corporate IP PBX 210 to the desired PBX phone 195. In this case, the call link includes the original portions of the call link 190 through the LEC 60 and voice over IP gateway 95 to the application server 85. The call then follows the new link 205 to the PBX phone 195.

Figure 9:
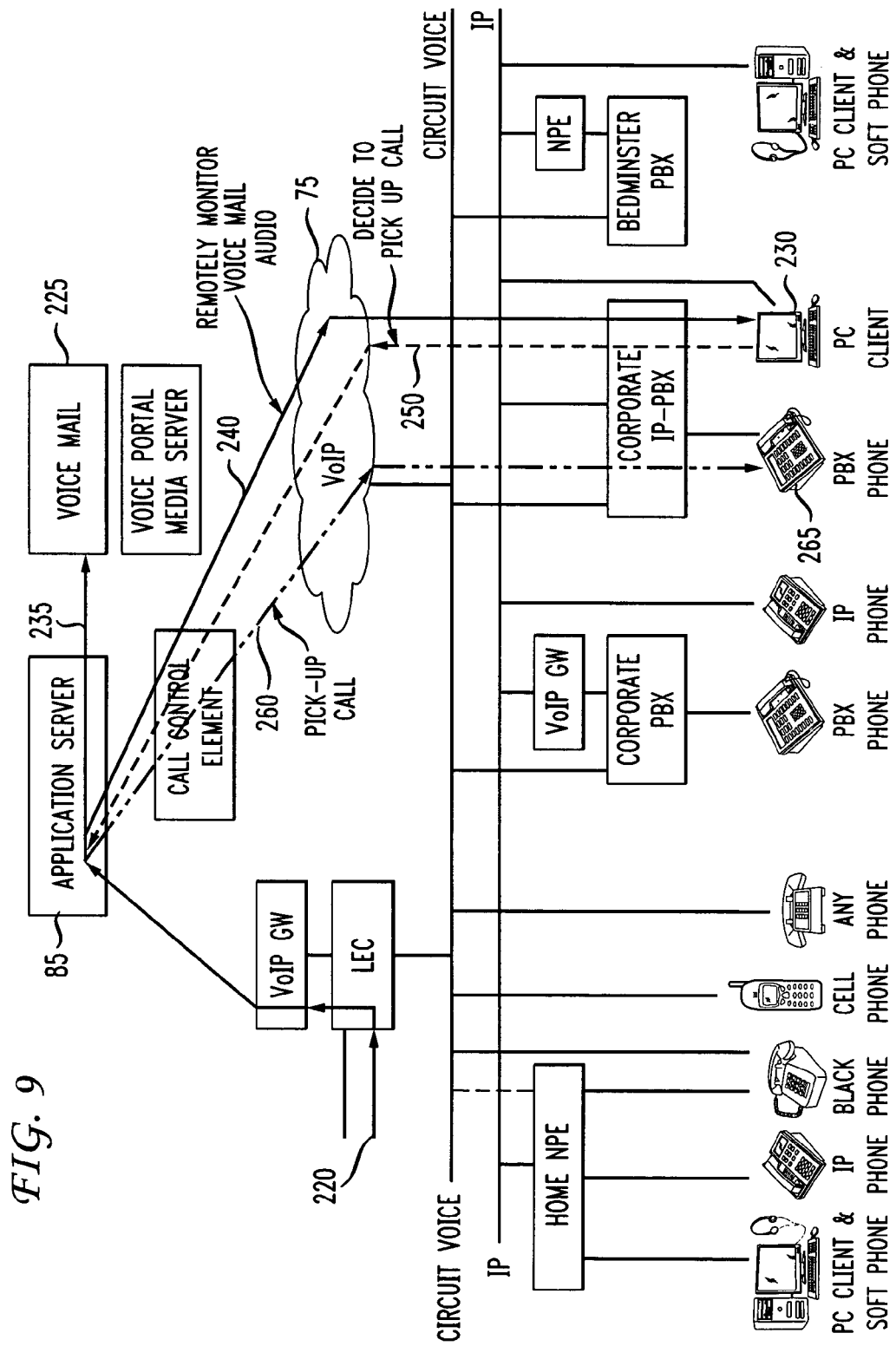
FIG. 9 illustrates the manner in which you may provide remote call screening.

Referring now to FIG. 9, there is illustrated the manner in which a third party may remotely screen calls according to the present invention. An incoming call travels over link 220 through the LEC 60 and voice over IP gateway 95 to the application server 85. The application server routes the call to both the voice mail system 225 and to a PC client 230 over links 235 and 240, respectively. The link 235 enables the received call to be recorded by the voice mail system 225. The link 240 travels over the IP network 75 to the PC client 230 to enable a third party to remotely screen the incoming call. The user may decide to pick up a call by sending a request 250 back to the application server 85 over the voice over IP network 75. The application server 85 routes the call over link 260 through the IP network 75 back to a PBX phone 265 designated by the third party user.

The previous description is of a preferred embodiment for implementing the invention, and the scope of the invention should not necessarily be limited by this description. The scope of the present invention is instead defined by the following claims.

What is claimed as new and desired to be protected by Letters Patent of the United States is:

1. A system for call control, comprising:
   a control gateway providing control access to an IP network;
   at least one IP device connected to the control gateway, said at least one IP device configured to control a call, the IP device adapted to translate an SIP address into one or more physical addresses on the IP network, the IP device adapted to route the call over multiple call links to ring all phones of a set of separate phones at each of a plurality of destinations, the set of separate phones comprising a cell phone destination, a voice over IP phone, and a PBX phone, via the IP device, controlling a plurality of applications associated with the call using an SIP protocol, the applications comprising remote voice mail screening, call transfer to another phone prior to picking up a destination phone, midcall transfer to another phone, call logging, adding the call to an audio conference, putting a caller on hold, remote call hangup, ringing multiple phones on an incoming call, a screen popup on a personal computer that indicates who is calling, providing a picture of the caller, managing multiple devices and telephone numbers, controlling one button dialing from a phone, and voice dialing control.

2. The system of claim 1, wherein the IP device controls the call using the SIP protocol, the IP device adapted to receive a particular number to be dialed from a personal computer client, the personal computer client provide the number based upon a click.

3. The system of claim 1, wherein the IP device controls the call using a protocol having a call control portion and a voice control portion.

4. The system of claim 1, wherein the IP device provides a service application of the plurality of applications, the service application adapted for controlling the call, the service application adapted to route the call to both a voice mail system and to a personal computer client, the service application adapted to connect the call to a PBX phone responsive to a request from the user indicative of a decision to pick up the call.

5. The system of claim 1, further including a communications device for receiving the call.

6. The system of claim 1, wherein the IP device controls the call using a protocol having a call control portion and a voice control portion, via the voice control portion, the IP device adapted to receive a voice command from a cell phone and determine a party to call from the voice command, the IP device adapted to cause an establishment of a connection between the cell phone and the party.

7. The system of claim 1, wherein the IP device provides a second service application under control of the IP device, the second service application adapted to transfer the call from a cell phone to the PBX phone, the IP device adapted to receive a voice command from the cell phone, the voice command indicative of a party to call, the IP device adapted to cause a connection to be established to a third party via a dial request based upon the voice command.

8. The system of claim 1, wherein the call is routed through a Public Switched Telephone Network and an IP network.

* * * * *